United States Patent
Kohzaki

(10) Patent No.: US 10,449,667 B2
(45) Date of Patent: Oct. 22, 2019

(54) ROBOT PEDESTAL HAVING SUPPORT STRUCTURE FOR CONTROLLER

(71) Applicant: FANUC CORPORATION, Minamitsuru-gun, Yamanashi (JP)

(72) Inventor: Shigeru Kohzaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/292,524

(22) Filed: Oct. 13, 2016

(65) Prior Publication Data
US 2017/0106529 A1    Apr. 20, 2017

(30) Foreign Application Priority Data
Oct. 16, 2015    (JP) .................................. 2015-204458

(51) Int. Cl.
*B25J 9/00*    (2006.01)
*F16M 9/00*    (2006.01)

(52) U.S. Cl.
CPC .......... *B25J 9/0009* (2013.01); *B25J 9/0096* (2013.01); *F16M 9/00* (2013.01)

(58) Field of Classification Search
CPC ...... B25J 9/0009; B25J 9/0096; B25J 9/0021; B25J 1/12; F16M 9/00; A47B 13/16
USPC ...... 248/678, 188.1, 188.7, 676, 677, 188.2, 248/188.8; 108/25, 26
See application file for complete search history.

(56) References Cited

U.S. PATENT DOCUMENTS

| | | | | |
|---|---|---|---|---|
| 201,047 | A * | 3/1878 | Raible | A47B 41/00 312/280 |
| 919,052 | A * | 4/1909 | Miller | A47B 49/00 108/80 |
| 1,179,955 | A * | 4/1916 | Ohnstrand | A47B 13/021 108/156 |
| 1,880,386 | A * | 10/1932 | Gray | B25H 1/00 108/104 |
| 2,348,043 | A * | 5/1944 | Webb Irving F | D05B 75/02 112/217.1 |
| 3,533,586 | A * | 10/1970 | Tebbs, Jr. | A47B 13/06 148/DIG. 119 |
| 3,852,865 | A * | 12/1974 | Ragard | H05K 13/0053 29/56.6 |
| 3,856,371 | A * | 12/1974 | Forsyth | A47B 3/12 108/156 |

(Continued)

FOREIGN PATENT DOCUMENTS

| | | |
|---|---|---|
| DE | 2743940 A1 | 5/1978 |
| DE | 29711523 U1 | 7/1998 |

(Continued)

*Primary Examiner* — Jonathan Liu
*Assistant Examiner* — Guang H Guan
(74) *Attorney, Agent, or Firm* — RatnerPrestia

(57) ABSTRACT

A lightweight and low-cost robot pedestal, by which a robot mechanical unit and a robot controller can be integrally conveyed. The pedestal has a mount part on which the robot mechanical unit is mounted, and a plurality of legs arranged on a lower portion of the mount part and configured to support the mount part. The neighboring legs among the plurality of legs have respective protruding portions opposed to each other and configured to support the controller, and have respective fixing members configured to fix the controller supported by the protruding portions to the neighboring legs.

2 Claims, 3 Drawing Sheets

(56) References Cited

U.S. PATENT DOCUMENTS

| | | | |
|---|---|---|---|
| 4,123,877 A | 11/1978 | Pere | |
| 4,209,898 A * | 7/1980 | Aoki | B23P 21/004 198/345.3 |
| 4,813,125 A * | 3/1989 | Dacey, Jr. | B62D 65/00 29/33 K |
| 5,072,506 A * | 12/1991 | Dacey, Jr. | B23P 19/00 29/464 |
| 5,539,975 A * | 7/1996 | Kukuljan | B23P 21/004 198/346.2 |
| 6,427,966 B1 * | 8/2002 | Blumenschein | A47B 91/005 248/646 |
| 6,494,419 B2 | 12/2002 | Pai | A45D 19/04 108/132 |
| 6,715,391 B2 * | 4/2004 | Wang | B23D 45/025 144/286.1 |
| 6,763,573 B2 * | 7/2004 | Walt, II | B23P 19/066 173/180 |
| 7,063,301 B2 * | 6/2006 | Schauer | B23Q 1/01 220/571 |
| 7,229,333 B2 * | 6/2007 | Bamesberger | A63H 33/00 446/482 |
| 7,252,276 B2 * | 8/2007 | Acketts | A47B 91/005 248/188.8 |
| 7,263,851 B2 * | 9/2007 | Yun | F25D 23/006 181/207 |
| 7,469,460 B2 * | 12/2008 | Jaeger | B23Q 1/01 29/564 |
| 7,752,861 B2 * | 7/2010 | Ishihara | F24F 1/50 248/237 |
| 7,810,782 B1 * | 10/2010 | Driscoll | D06F 39/125 248/346.01 |
| 8,245,649 B1 * | 8/2012 | Ratliff | A47D 3/00 108/156 |
| 8,403,387 B2 * | 3/2013 | Nakasugi | B25J 15/0009 269/900 |
| 8,424,136 B2 * | 4/2013 | Rozewicz | A61G 13/00 280/30 |
| 8,991,288 B2 * | 3/2015 | Watanabe | B23Q 1/015 409/235 |
| 9,027,231 B2 * | 5/2015 | Mimura | B23P 21/00 29/720 |
| 9,052,120 B2 * | 6/2015 | Villar | F24F 13/32 |
| 9,089,213 B2 * | 7/2015 | Masuda | G03G 21/16 |
| 9,120,221 B2 * | 9/2015 | Nakasugi | B23P 21/00 |
| 9,138,896 B2 * | 9/2015 | Jenkinson | B25J 9/1697 |
| 9,174,311 B2 * | 11/2015 | Osicki | B25H 1/02 |
| 9,526,375 B2 * | 12/2016 | Chang | A47J 37/0713 |
| 9,573,229 B2 * | 2/2017 | Li | B23P 19/001 |
| 2005/0193576 A1 * | 9/2005 | Hollman | G01R 31/2891 33/286 |
| 2012/0193505 A1 * | 8/2012 | Baron | F24F 1/40 248/636 |
| 2015/0176754 A1 * | 6/2015 | Houston | B25J 9/0009 248/125.2 |
| 2016/0199985 A1 * | 7/2016 | Ganninger | B44C 1/18 156/60 |
| 2017/0106529 A1 * | 4/2017 | Kohzaki | F16M 9/00 |
| 2017/0291297 A1 * | 10/2017 | Miyasaka | B25J 9/047 |
| 2018/0290290 A1 * | 10/2018 | Uchiyama | B25H 1/04 |

FOREIGN PATENT DOCUMENTS

| | | |
|---|---|---|
| DE | 10335570 A1 | 2/2005 |
| DE | 202010008616 U1 | 5/2011 |
| DE | 102010027280 U1 | 1/2012 |
| JP | H08-001574 A | 1/1996 |
| JP | H08-168990 A | 7/1996 |
| JP | 2007185735 | 7/2007 |

* cited by examiner

ROBOT PEDESTAL HAVING SUPPORT STRUCTURE FOR CONTROLLER

BACKGROUND OF THE INVENTION

1. Field of the Invention

The present invention relates to a pedestal on which a robot is mounted, wherein the pedestal has a structure for supporting a controller of the robot.

2. Description of the Related Art

In an industrial robot, in order to save space, a controller for controlling the robot may be positioned within a pedestal on which the robot is mounted. As relevant prior art documents, JP H08-001574 A discloses a robot system including a robot mounted on an upper part of a pedestal, and a robot controller contained in the pedestal, wherein the robot and the controller are connected to each other by a connection cable inserted into a hole formed on the upper part of the pedestal.

Further, JP H08-168990 A discloses a configuration in which: a body of an industrial robot is mounted on a pedestal; a robot controller is contained in a lower space of the pedestal; a drive motor of the robot. is arranged so as to protrude below the body; and the drive motor and the robot controller are cooled by a common cooling means.

FIG. 3 shows an example of a schematic configuration of a conventional robot pedestal. Pedestal 100 has a mount part (upper part) 104 on which a robot (mechanical unit) 102 is mounted, four legs 106 arranged on a lower part of mount part 104, and a plate-like controller support member 108, wherein a controller 110 for controlling robot mechanical unit 102 is positioned on and fixed to support member 108. By using pedestal 100 as shown in FIG. 3, robot mechanical unit 102 and controller 110 can be integrally conveyed or moved. However, it is necessary to arrange a structural member such as support member 108 (e.g., a steel sheet) on pedestal 100, resulting in an increase in the weight and cost of the pedestal. The structure as described in JP H08-001574 A or JP H08-168990 A is similar to the configuration of FIG. 3.

FIG. 4 shows another example of a schematic configuration of a conventional robot pedestal. Pedestal 200 has a mount part (upper part) 204 on which a robot (mechanical unit) 102 is mounted, four legs 206 arranged on a lower part of mount part 204, wherein a controller 110 for controlling robot mechanical. unit 102 is positioned on a floor below mount part 204. Pedestal. 200 as shown in FIG. 4 is more advantageous than pedestal 100 of FIG. 3 with respect to the weight and cost, However, pedestal 200 does not have a structural member such as support member 108 as shown in FIG, 3, and thus pedestal 200 and controller 110 are substantially separated from each other. Therefore, when the robot must be moved or shifted, it is necessary to independently convey and install robot mechanical unit 102 (or pedestal 200) and controller 110, which requires many man-hours.

SUMMARY OF THE INVENTION

An object of the present invention is to provide a lightweight and low-cost robot pedestal, by which a robot mechanical unit and a robot controller can be integrally conveyed.

The present invention provides a robot pedestal comprising: a mount part on which a robot mechanical unit is mounted; and a plurality of legs arranged on a lower portion of the mount part and configured to support the mount part, wherein neighboring legs among the plurality of legs have respective protruding portions opposed to each other and configured to support a controller of the robot mechanical unit, and have respective fixing members configured to fix the controller supported by the protruding portions to the neighboring legs.

In a preferred embodiment, each of the protruding portions extends in a horizontal direction from a lower end of the leg where the protruding portion is formed toward the other protruding portion.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
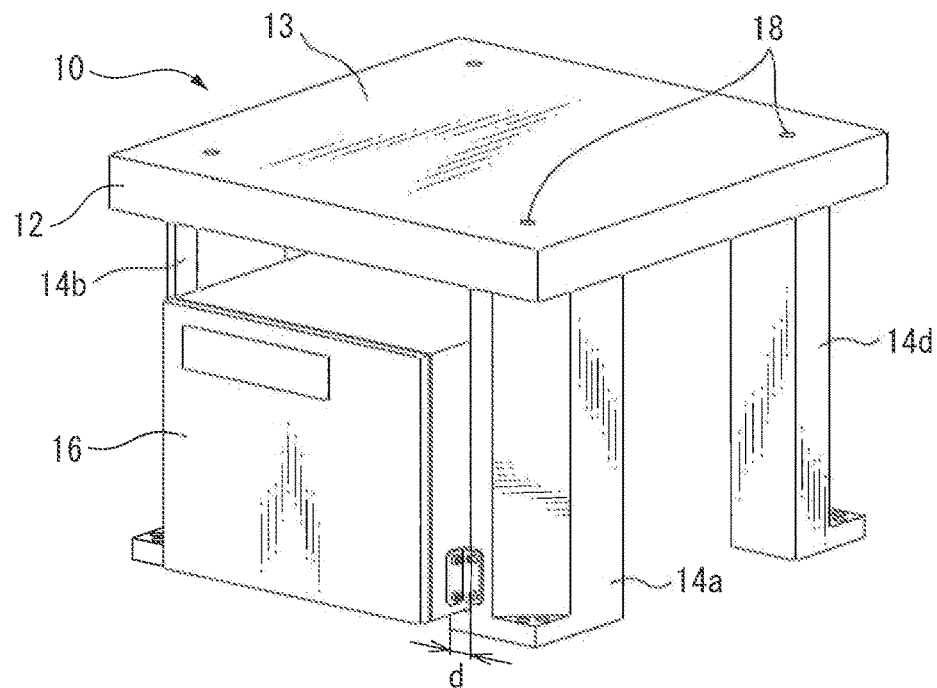
FIG. 1 is a perspective view of a schematic configuration of a robot pedestal according to a preferred embodiment of the present invention.
Figure 3:
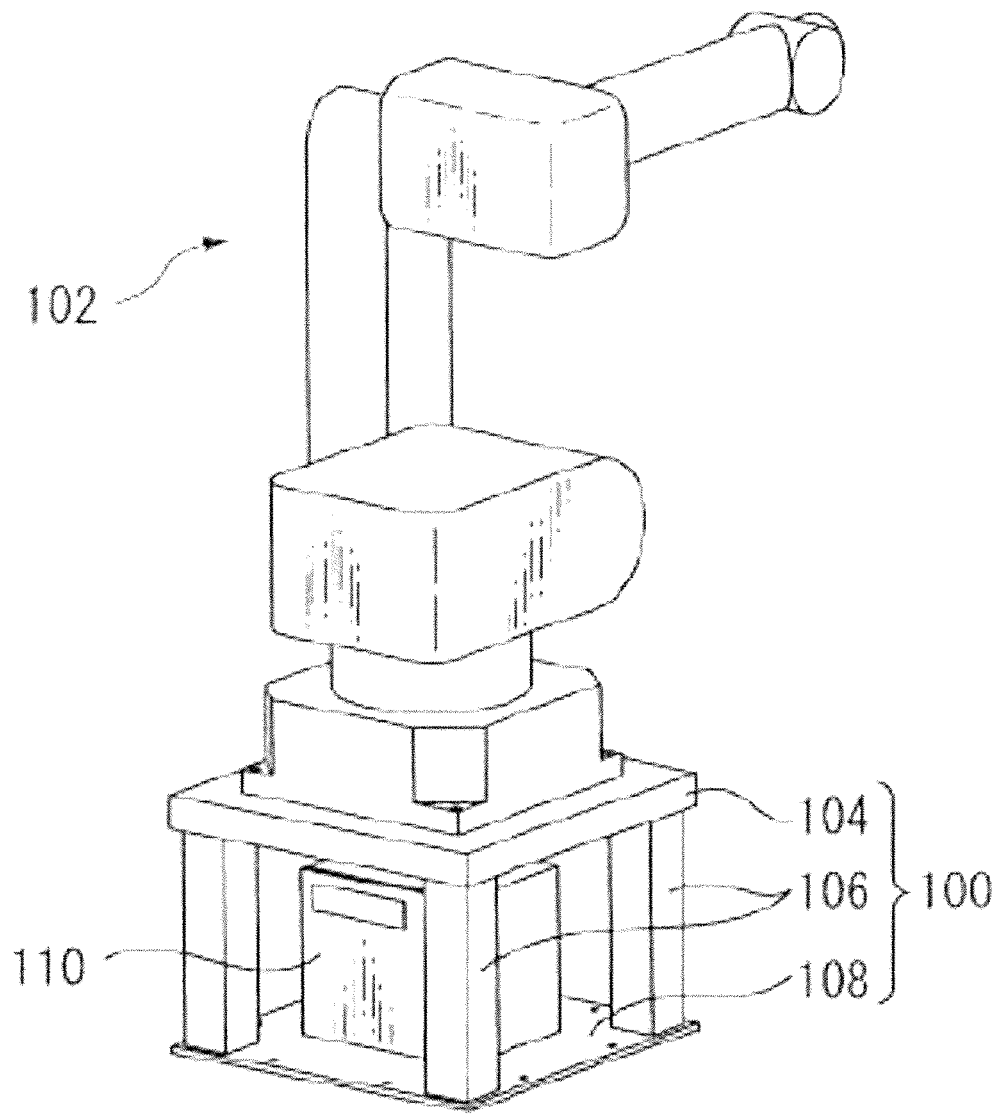
FIG. 3 shows an example of a schematic configuration of a conventional robot pedestal.
Figure 4:
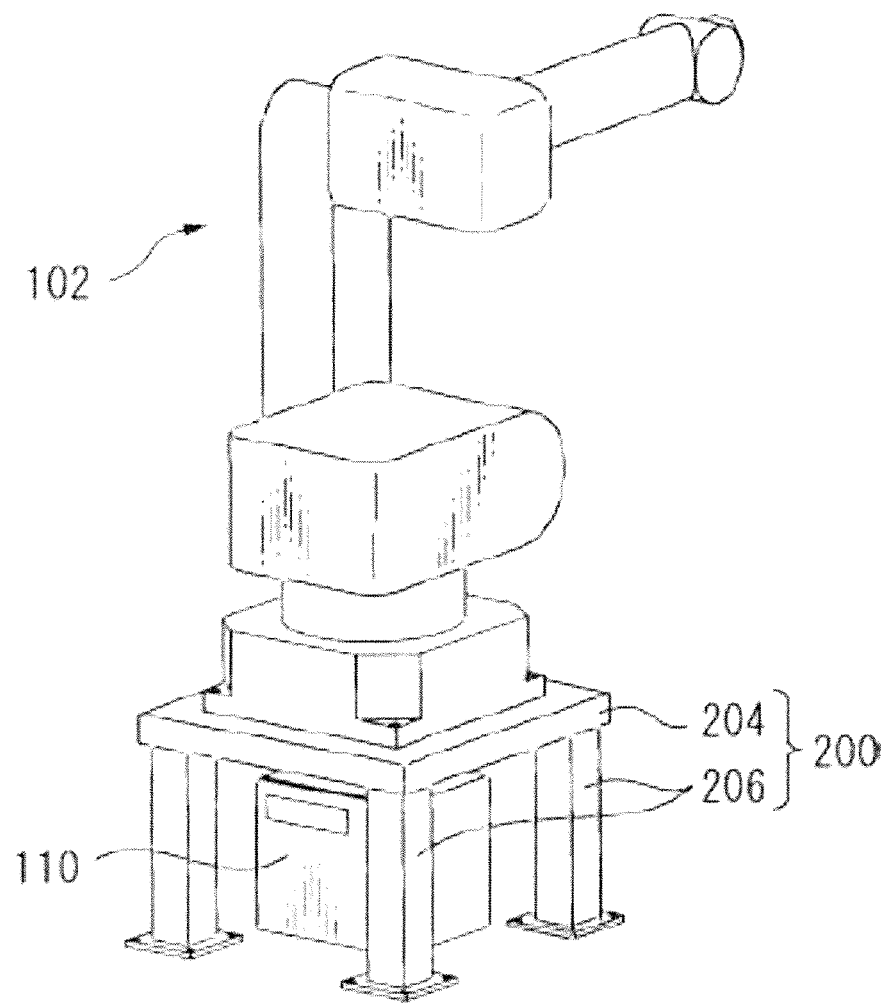
FIG. 4 shows an example of a schematic configuration of another conventional robot pedestal.

FIG. 1 is a perspective view of a schematic configuration of a robot pedestal (hereinafter, also referred to as merely the "pedestal") 10 according to a preferred embodiment of the present invention. Pedestal 10 has a mount part (plate) 12 on which a robot mechanical unit (not shown) such as robot mechanical unit 102 as shown in FIG. 3 or 4 is mounted, and a plurality of (in the illustrated embodiment, four) legs 14a to 14d arranged on a lower portion of mount part 12 and configured to support mount part 12, The robot mechanical unit on mount part 12 is controlled by a controller 16 positioned below mount part 12.

Mount part 12 has a fastening section (in the illustrated embodiment, a tapped hole) 18 formed on an upper portion 13 of mount part 12, for fixing the robot mechanical unit to mount part 12. By fastening a base of the robot mechanical unit to mount part 12 by using a fastening bolt (not shown) configured to engage with tapped hole 18, the robot mechanical unit can be fixed to pedestal 10. As the robot mechanical unit mounted on mount part 12, for example, a multi-joint robot having six axes can be used. However, the present invention is not limited as such, for example, another type of industrial robot, etc., can be used as the robot mechanical unit.

Figure 2:
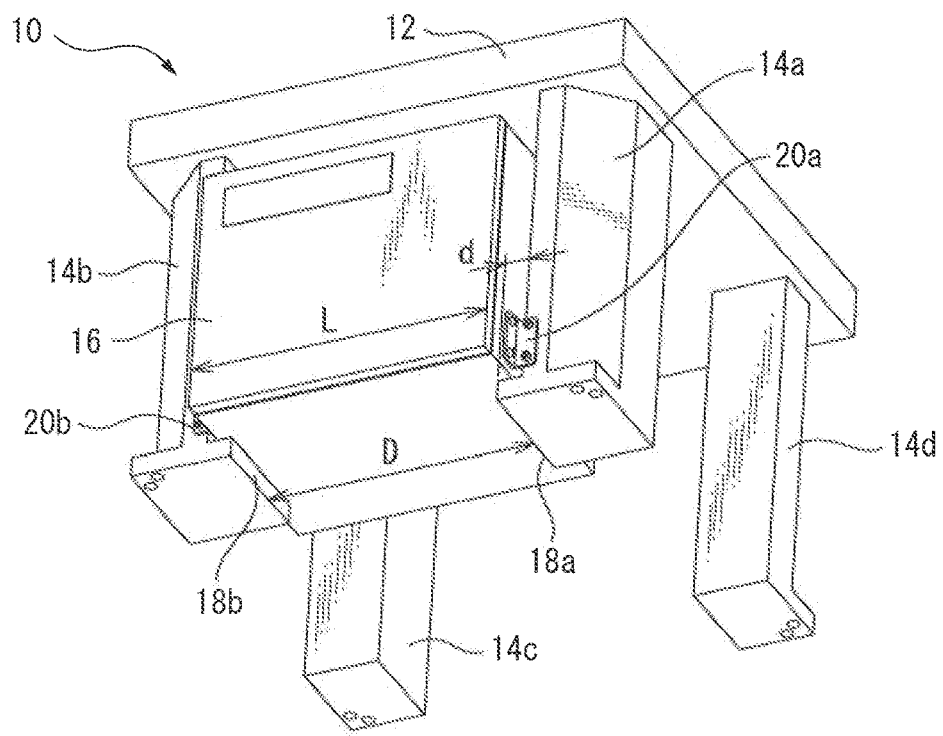
FIG. 2 is a perspective view of the pedestal of FIG. 1 viewed from another angle.

FIG. 2 is a perspective view of pedestal 10 viewed in an obliquely downward direction. Among plurality of legs 14a to 14b, neighboring two legs (in the illustrated embodiment, legs 14a and 14b), which are not in the diagonal relationship, have protruding portions 18a and 18b, respectively. Protruding portions 18a and 18b are opposed to each other and configured to support controller 16. Further, two legs 14a and 14b have fixing members 20a and 20b (in the illustrated embodiment, L-shaped rails or brackets), respectively, which are configured to fix controller 16 supported by protruding portions 18a and 18b to neighboring legs 14a and 14b. In detail, protruding portion 18a extends in a generally horizontal direction from a lower end of leg 14a where protruding portion 18a is formed toward other protruding portion 18b (or leg 14b). On the other hand, protruding portion 18b extends in a generally horizontal direction from a lower end of leg 14b where protruding portion 18b is formed toward other protruding portion 18a (or leg 14a).

As shown in FIG. 1 or 2, controller 16 is mounted on protruding portions 18a and 18b, and controller 16 is fixed to legs 14a and 14b by fixing members 20a and 20b, respectively. By virtue of this, controller 16 can be conveyed integrally with pedestal 10 (or the robot mechanical unit). Therefore, by using pedestal 10, the robot mechanical unit and the controller can be integrally conveyed or shifted, without using the component such as support member 108 as shown in FIG. 3. Further, in the embodiment, since the support member is not necessary, the weight and cost of the pedestal can be significantly reduced.

As shown in FIG. 2, a minimum distance "D" between protruding portions 18a and 18b is smaller than a dimension "L" of controller 16 between legs 14a and 14b (i.e., "L" corresponds to the outer dimension of controller 16 in the same direction as minimum distance "D") (D<L). On the other hand, the distance between legs 14a and 14b (in the horizontal direction) is larger than outer dimension L of controller 16. In this regard, in order to support controller 16 by protruding portions 18a and 18b, it is sufficient that the both ends of controller 16 in the horizontal direction are supported by protruding portions 18a and 18b, respectively. Therefore, it is preferable that minimum distance D between the two protruding portions be large as possible, while being smaller than outer dimension L of controller 16, in view of the weight and cost of pedestal 10. For example, minimum distance D may be equal to or larger than a half (½) of dimension L (D≥½·L), or may be equal to or larger than two-thirds (⅔) of dimension L (D≥⅔·L), or may be equal to or larger than three-quarters (¾) of dimension L (D≥¾·L), or may be equal to or larger than four-fifths (⅘) of dimension L (D≥⅘·L). Alternatively, a protruding length "d" of each protruding portion, from the leg toward the other protruding portion, may be determined as a minimum length (e.g., not more than 5 cm, or mot more than 3 cm, or not more than 1 cm) required for supporting controller 16.

In FIG. 1 or 2, each of protruding portions 18a and 18b is illustrated as a rectangular tab-like member. However, the present invention is not limited as such, and each protruding portion may have an arbitrary shape as long as the protruding members can support (the weight of) controller 16. In addition, although each of fixing members 20a and 20b is illustrated as an L-shaped bracket, each fixing member may have an arbitrary structure as long as the controller 16 can be fixed to legs 14a and 14b.

In the above embodiment, the pedestal has four legs. However, even when the number of legs of the pedestal is three, five or more, the structure of the protruding portion or the fixing member may be the same as when the number of legs is four.

By virtue of the robot pedestal according to the present invention, the robot mechanical unit and the robot controller can be integrally or collectively conveyed or moved, without arranging another structure at the lower side of the pedestal for supporting the controller.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot pedestal comprising:
a mount part for mounting a robot mechanical unit;
a robot controller for controlling the robot mechanical unit, the robot controller including a top surface arranged beneath the mount part and a bottom surface arranged below the top surface;
a plurality of legs arranged beneath the mount part on a lower portion of the mount part and configured to support the mount part, each of neighboring legs among the plurality of legs including a protruding portion arranged beneath of the mount part, the protruding portions of the neighboring legs extending in horizontal directions opposed to each other, the protruding portion of each of the neighboring legs including a top surface facing in a first direction towards the mount part and a bottom surface facing in a second direction opposite the first direction and away from the mount part, and the bottom surface of the robot controller seated on the top surface of the protruding portion of each of the neighboring legs; and
a plurality of brackets fixed to the robot controller and fixing the robot controller to the neighboring legs, each of the plurality of brackets fixed to a respective one of the neighboring legs above the top surface of the protruding portion of the respective one of the neighboring legs, each of the plurality of brackets including a first bracket portion fixed to a respective one of side surfaces of the robot controller and a second bracket portion fixed to a side surface of the respective one of the neighboring legs, and
wherein a fastening section for fixing the robot mechanical unit to the mount part is formed on an upper portion of the mount part.

2. The robot pedestal as set forth in claim 1, wherein each of the protruding portions of the neighboring legs extends in a respective one of the horizontal directions from a lower end of a corresponding one of the neighboring legs, and the protruding portions of the neighboring legs extend towards one another.

* * * * *